UNITED STATES PATENT OFFICE.

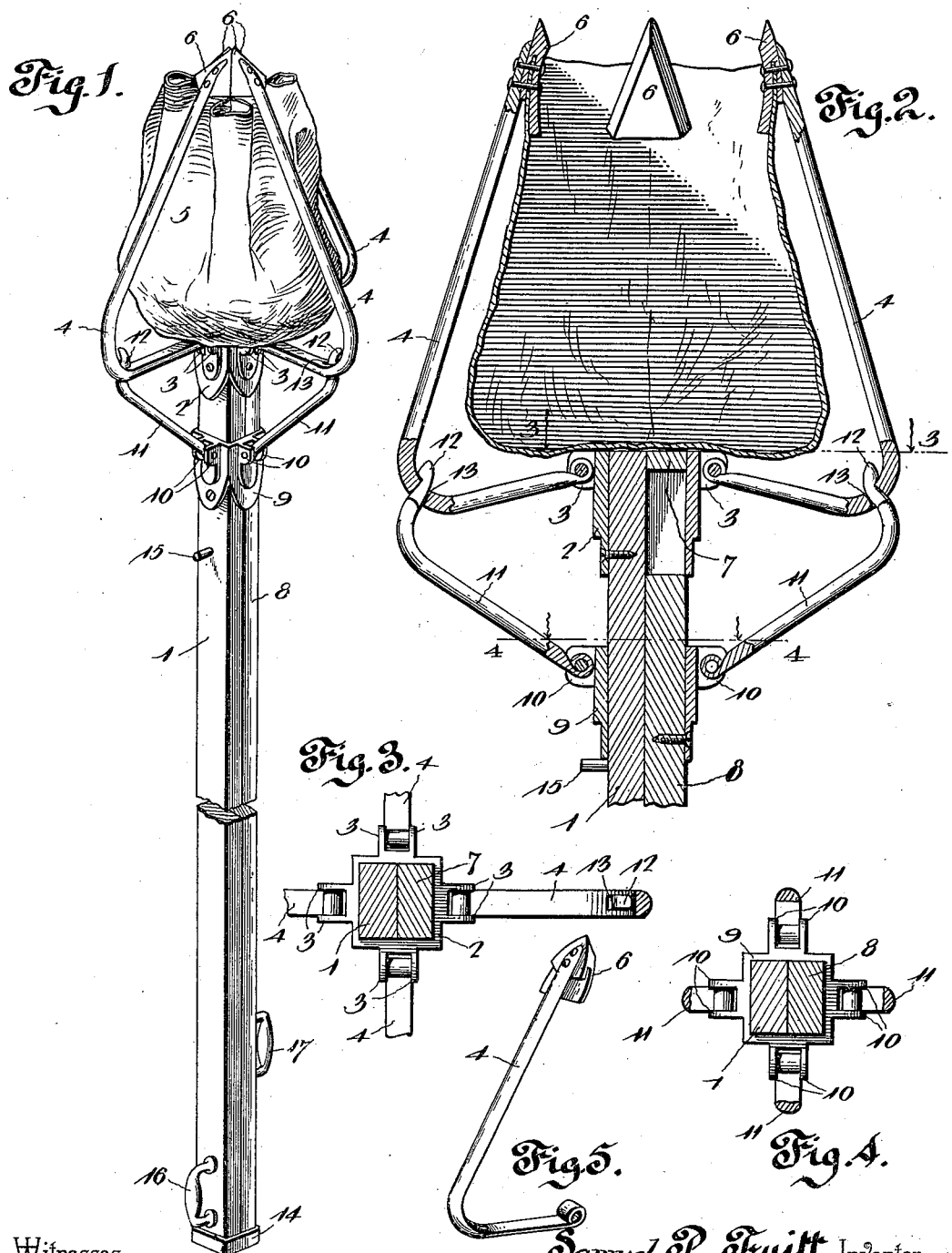

SAMUEL P. TRUITT, OF NOVINGER, MISSOURI.

FRUIT-PICKER.

SPECIFICATION forming part of Letters Patent No. 621,509, dated March 21, 1899.

Application filed August 27, 1898. Serial No. 689,700. (No model.)

*To all whom it may concern:*

Be it known that I, SAMUEL P. TRUITT, a citizen of the United States, residing at Novinger, in the county of Adair and State of Missouri, have invented a new and useful Fruit-Picker, of which the following is a specification.

The invention relates to improvements in fruit-pickers.

The object of the present invention is to improve the construction of fruit-pickers and to provide a simple, inexpensive, and efficient device capable of rapidly picking a quantity of fruit without bruising or otherwise injuring the same and adapted to permit such fruit to be readily lowered to the ground and deposited in a receptacle without jar.

The invention consists in the construction and novel combination and arrangement of parts, as hereinafter fully described, illustrated in the accompanying drawings, and pointed out in the claims hereto appended.

In the drawings, Figure 1 is a perspective view of a fruit-picker constructed in accordance with this invention, the jaws being closed. Fig. 2 is a longitudinal sectional view of the same, the jaws being open. Fig. 3 is a transverse sectional view on line 3 3 of Fig. 2. Fig. 4 is a similar view on line 4 4 of Fig. 2. Fig. 5 is a detail perspective view of one of the jaws.

Like numerals of reference designate corresponding parts in all the figures of the drawings.

1 designates a pole, preferably rectangular in cross-section and provided at its upper or outer end with a head 2, also rectangular to conform to the configuration of the pole; but the parts may be of any other shape, if desired. The head 2 is provided at the end of the pole with a series of perforated ears 3, arranged in pairs, as shown, and having hinged between them the inner or lower end of a series of jaws 4, which are substantially L-shaped. The ears may be formed integral with the head or be constructed in any other suitable manner, and the lower arms of the jaws extend outward and are substantially horizontal when the pole is upright, and the outer engaging arms of the jaws, which are arranged at an acute angle to the lower arms, converge and are adapted, as illustrated in Fig. 1 of the accompanying drawings, to meet beyond the end of the pole, whereby they are adapted to engage the stems of fruit and confine the latter within a flexible receptacle or bag 5, arranged within the series of jaws and connected with the outer portions of the same.

The extremities or engaging portions of the jaws are provided with substantially triangular pieces 6, arranged on the inner faces of the flexible receptacle or bag and having beveled edges, whereby they are adapted to fit closely together, as illustrated in Fig. 1 of the drawings. The triangular pieces enable the jaws to grasp a stem firmly, so that fruit may be picked from a tree without injuring the said fruit. The outer faces of the triangular pieces are recessed at their lower portions to receive the upper edges of the flexible receptacle or bag, which is secured to the jaws by the fastening devices for attaching the triangular pieces. By arranging the flexible receptacle or bag within the series of jaws it is supported by the same, and they are adapted to hold the bag or receptacle closed to prevent fruit from falling out of the device when lowering the same to the ground.

The head 2 is extended beyond the pole at one side thereof and is supported by a block 7, and it forms a partial socket for the upper end of a sliding operating bar or section 8, arranged longitudinally of the pole and connected with and adapted to open and close the jaws. The upper or outer portions of the pole and the sliding section or bar are embraced by a sleeve 9, provided with a series of ears 10 and connected with the jaws by links 11, diverging from the pole and the bar or section and consisting of rods pivoted at their inner ends to the ears 10 and having their outer ends reduced at 12 and arranged in perforations 13 of the jaws at the juncture of the inner and outer arms. The ends 12 are slightly bent after being passed through the perforations 13 to prevent the links from becoming accidentally disengaged from the jaws, and this manner of interlocking the parts forms a hinge-joint which is exceedingly effective and which permits the jaws to swing inward and outward. When the bar or section is reciprocated, the jaws are swung inward and outward to close and open the bag or receptacle. The lower portion of the pole and the sliding bar or section are embraced by a band 14, which is secured to the pole, and the said sleeve 9 is attached to the sliding bar or section. The inward movement of the jaws is limited by their contact with one another, and their outward movement is limited by a stop 15, mounted on the pole and arranged to be engaged by the sleeve.

In order to enable the fruit-picker to be readily operated, it is provided with handles 16 and 17, located, respectively, at the lower end of the pole and at one side of the sliding bar or section a short distance above the other handle, and the said handles, which are located at opposite sides of the device, are adapted to be readily grasped by the operator.

The invention has the following advantages: The fruit-picker, which is simple and comparatively inexpensive in construction, possesses great strength and durability, and it is capable of convenient operation. The bag or receptacle is supported within the series of jaws and is opened and closed by the same. The jaws are adapted to engage the stems of fruit, and the latter may be readily picked from a tree and deposited into a receptacle on the ground or other support without bruising the same. The receptacle or bag may be held securely closed in lowering the fruit, and it can be partially opened to permit the same to escape from it slowly.

Changes in the form, proportion, and minor details of construction may be resorted to without departing from the spirit or sacrificing any of the advantages of this invention.

What is claimed is—

1. A device of the class described comprising a pole, a centrally-arranged flexible bag or receptacle having its bottom resting upon and supported by the upper end of the pole, and a series of jaws mounted upon the pole and arranged around the exterior of the flexible bag or receptacle and retaining the same in its central position, said jaws being connected to the mouth of the bag or receptacle at intervals and adapted to open and close the same, substantially as described.

2. A device of the class described comprising a pole, a centrally-arranged flexible bag or receptacle having its bottom resting upon and supported by the top of the pole, and a series of substantially L-shaped jaws arranged around the exterior of the bag or receptacle and having their transverse arms extending beneath the bottom of the bag or receptacle and hinged to the pole, the outer ends of the jaws being attached at intervals to and arranged around the mouth of the bag or receptacle and extending slightly beyond and adapted to meet over the same, substantially as described.

3. A device of the class described comprising a pole, a series of jaws mounted thereon and having converging portions adapted to meet beyond the pole, a flexible receptacle or bag arranged within the series of jaws and supported by the same, the tapering pieces mounted on the jaws at the engaging ends thereof and extending into the receptacle or bag, and means for operating the jaws, substantially as described.

4. A device of the class described comprising a pole, a flexible bag or receptacle centrally arranged above the pole and having its bottom resting upon and supported by the upper end of the said pole, a series of substantially L-shaped jaws arranged around the exterior of the bag or receptacle and having their transverse arms extending beneath the bottom of the same and provided at their angles with perforations, a head mounted upon the pole and provided with perforated ears arranged in pairs and having the inner end of the jaws pivoted between them, a sliding sleeve mounted on the pole and provided with ears arranged in pairs, links pivoted between the ears of the sliding sleeve and having their outer ends engaging the perforations of the jaws and connected with the latter, and the sliding section mounted on the pole and connected with the sleeve, substantially as described.

5. A device of the class described comprising a pole, a series of substantially L-shaped jaws hinged to the pole and provided at the juncture of their arms with perforations, a sliding device mounted on the pole, and links hinged to the sliding device and having reduced ends fitting in the perforations, whereby the links are hinged to the jaws, substantially as described.

6. A device of the class described comprising a pole, a sliding section mounted on the pole and arranged in suitable guides, handles mounted on the pole and the sliding section and adapted for reciprocating the latter and for holding the device, a bag or receptacle centrally mounted over the top of the pole, a series of jaws arranged at intervals around the exterior of the bag or receptacle and connected with the mouth of the same and with the upper end of the pole, and a series of links arranged around the pole and connected with the jaws and with the sliding section, substantially as described.

In testimony that I claim the foregoing as my own I have hereto affixed my signature in the presence of two witnesses.

SAMUEL P. TRUITT.

Witnesses:
Y. W. SEIBENGUR,
GEO. M. DAVIS.